Nov. 4, 1958 J. J. SAYKAY 2,859,276

APPARATUS FOR KEY OPERATED MECHANISMS

Filed April 26, 1955 2 Sheets-Sheet 1

INVENTOR.
JOSEPH J. SAYKAY

BY

Campbell, Brumbaugh, Free & Graves his ATTORNEYS.

Nov. 4, 1958 J. J. SAYKAY 2,859,276

APPARATUS FOR KEY OPERATED MECHANISMS

Filed April 26, 1955 2 Sheets-Sheet 2

INVENTOR.
JOSEPH J. SAYKAY
BY
Campbell, Brumbaugh, Free & Graves
his ATTORNEYS.

United States Patent Office 2,859,276

Patented Nov. 4, 1958

2,859,276

APPARATUS FOR KEY OPERATED MECHANISMS

Joseph J. Saykay, Sea Cliff, N. Y.

Application April 26, 1955, Serial No. 504,065

12 Claims. (Cl. 178—17)

Figure 1:
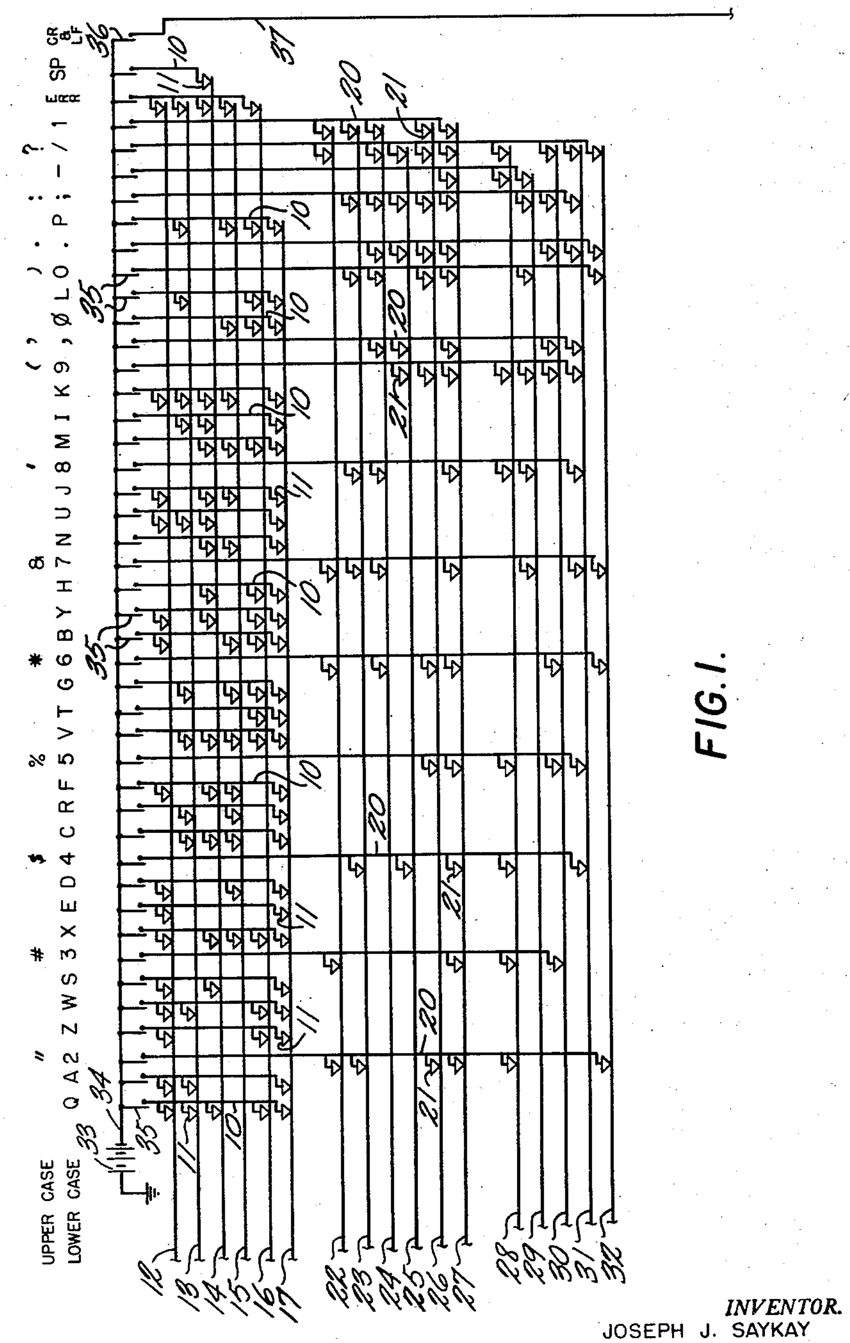

This invention relates to apparatus adapted to be employed with key operated writing mechanisms, and has particular reference to such apparatus capable of storing the written information in coded form on a desired storage medium.

It is often desirable not only to print information when utilizing various key operated mechanisms such as typewriters, adding machines and like apparatus but it is also advantageous to convert such information into coded symbols on a storage medium. For example, it has been found that much time and effort may be saved if information recorded by various office machines such as typewriters can be transferred to punched tape usable in common language machines. As is known, such machines operate on the five unit code. When such information is stored on punched tape, it may be transmitted during off peak hours over telegraph lines and be read at the receiving end by conventional teletype printers.

Common language machines, this term referring to those widely used machines which transmit or receive the five unit code, provide many advantages in transmitting and receiving information since their use is practically universal. However, with the five unit code permitting the use of only thirty-two different code combinations, it is necessary to employ two conditions of shift commonly designated "figures" and "letters" in order to increase the possible code combinations to a total of sixty-four. For this reason, each key of a telegraph printer keyboard carries two characters, one of which represents the lower case characters or "letters" and the other represents the upper case characters or "figures." In order to receive the lower case characters correctly, they must be preceded by the "letters" code symbol and the upper case characters must be preceded by the "figures" code symbol. While these two code symbols are purely functional in that the "letters" or the "figures" symbols or code combinations are not printed, they must still be punched in the tape in order to correctly operate the reading printer.

At the present time in fields other than communications, increasing use is being made of storage mediums such as perforated tape and magnetic tape to provide information storage for data processing in computers and like devices. Accordingly, key mechanisms other than telegraph printers such as typewriters, adding machines, computers and the like have been modified to store information on punched tape and other mediums. However, when standard office equipment is used to prepare the tape punched with the five unit code, difficulties present themselves due to the fact that certain office machines such as the standard typewriter include keyboards consisting of a row or rows of keys in which characters are carried in the lower and upper case. For example, the standard typewriter keyboard contains four rows of keys in which the first row represents the digits 2 to 0 in the lower case and punctuation marks in the upper case. Thus, the operator is not required to depress the typewriter shift key when writing the digits 2 to 0. However, if five unit code tape is being prepared, unless such digits are preceded by the "figures" code symbol, the tape will not be properly perforated and will incorrectly actuate the printing mechanism.

In view of the above, it has been necessary in the past to assign two of the typewriter keys to provide the "figures" and "letters" code symbols on the perforated tape. It will be apparent that the use of these two keys will, especially with an inexperienced operator, make for inefficiency in the entire typing operation.

It has been suggested that the foregoing problems be solved by employing a six unit code which has enough combinations to represent every key on the typewriter by a distinctly different code symbol. While information punched in six unit code can be transmitted over telegraph lines with the same facility as the five unit code, it is, of course, less economical in the use of line time. Thus, for every ten words in six unit code transmitted, eleven and one-half words may be transmitted in five unit code over the same period of time and at the same cost.

Accordingly, it is an object of the present invention to provide apparatus for use with conventional key operated mechanisms for storing information in a predetermined code on a storage medium.

It is another object of the invention to provide apparatus of the above character in which a code strip for producing electrical signals is associated with the key operated mechanism, the code strip being disconnected from selectively operated load devices after each actuation of such devices by the signals.

It is still another object of the invention to provide apparatus of the above character in which switch means are associated with a shift key to selectively couple to the load devices signals from one portion of selected code stacks in the code strip.

It is yet a further object of the invention to provide apparatus of the above character in which circuitry associated with a dual purpose key provides for impressing a pair of code symbols indicative of the key's functions on the storage medium.

These and further objects of the invention are accomplished by employing apparatus for generating distinctive code signals such as the code strip described in my Patent No. 2,665,336 with a desired key operated mechanism such, for example, as a typewriter. The signals provided upon energization of selected code stacks in the code strip are employed to actuate terminal relays through a universal relay, this element being arranged to disconnect the strip from the terminal relays upon its energization.

In addition, structure associated with the shift key of the key operated mechanism operates to select particular signals from the code stacks for application to the terminal relays. Further apparatus cooperates with the code strip for automatically energizing mechanism, such as tape perforators, for placing the "figures" or "letters" code symbols on the storage medium each time a change in the operation of the key operated mechanism occurs.

Certain machines employ dual purpose keys such, for example, as the carriage return and line feed key found on standard electric typewriters. Each of these functions must be represented by a code symbol in the five unit code. To provide this, another feature of the invention comprises an arrangement in which a pair of symbols are impressed on the storage medium in response to actuation of the single key.

Figure 2:
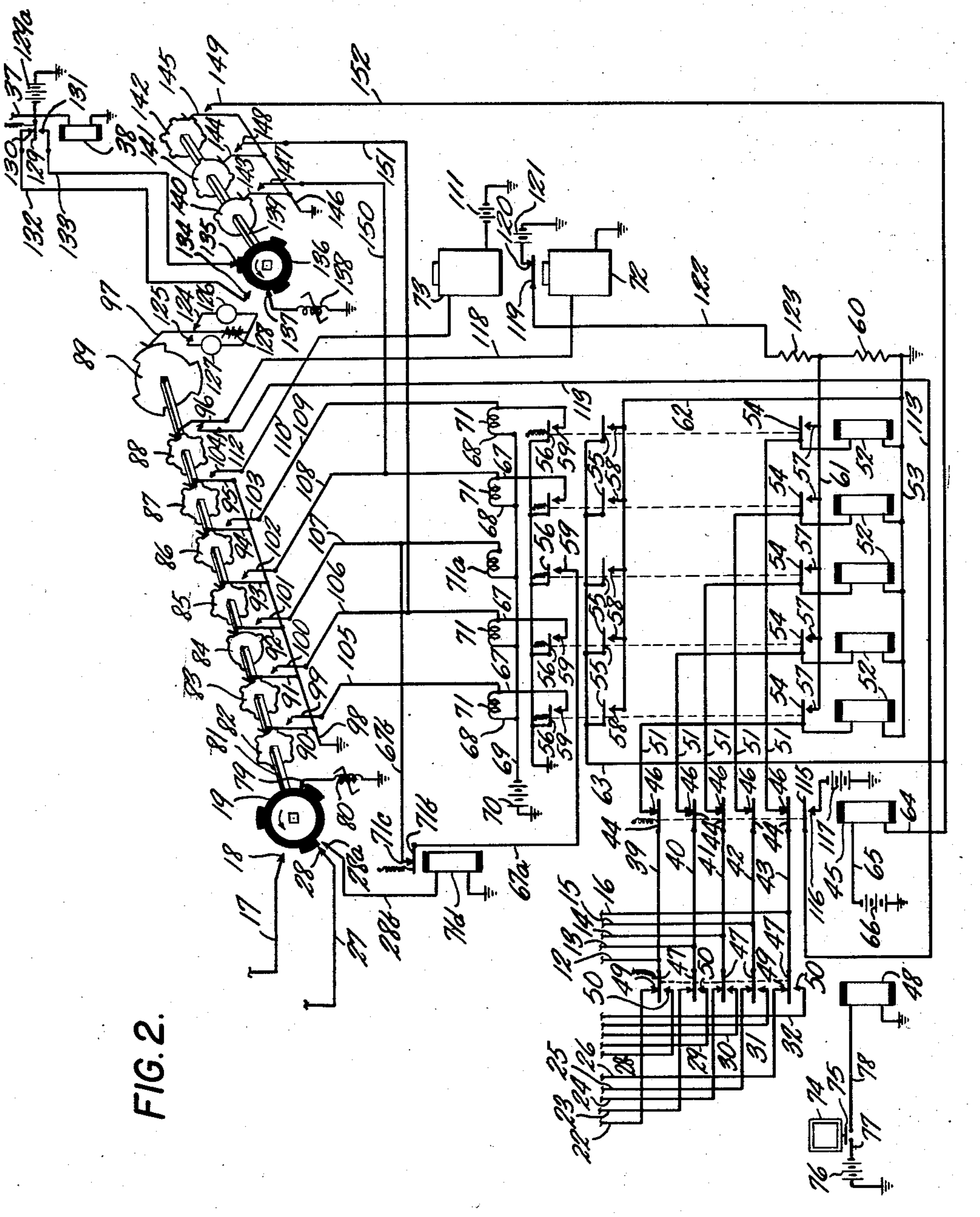

These and further objects and advantages of the invention will be more readily understood when the following description is read in connection with the following drawings in which:

Figure 1 is a schematic circuit diagram of a code strip employed in an illustrative embodiment of the invention; and Figure 2 is a schematic circuit diagram of apparatus in accordance with the present invention, this diagram adapted to be read in connection with Figure 1.

Referring to an illustrative embodiment of the invention in greater detail with particular reference to the drawings, apparatus adapted to be employed with a standard keyboard typewriter is shown. However, it will be understood that the invention is not limited to typewriters but may be utilized with adding machines, computers and like mechanisms.

The code strip in Figure 1 comprises a number of code stacks 10 representing letters placed thereabove, each of the stacks 10 being formed by a selected number of unidirectional conducting elements 11 joined to conductors 12 to 17, inclusive. Since the five unit code is being employed in this instance, lines 12 to 16, inclusive, carry code signals from the stacks 10 while line 17 terminates at a contact 18 (Figure 2) selectively engaging segments on a stepped commutator 19.

Also found in the code strip are code stacks 20 representing numbers and symbols as indicated, each of the stacks 20 being formed of unidirectional conducting elements 21 connected to lines 22 to 27, inclusive, and to lines 28 to 32, inclusive. Since the five unit code is being used, it will be apparent that line 27 does not function to carry information from the stacks 20 but is employed in a manner similar to the line 17. Thus, line 27 terminates at a contact 28 (Figure 2) selectively engaging the stepped commutator 19.

The code strip and stacks have been described in my U. S. Patent No. 2,665,336 and further referred to in my copending U. S. application Serial No. 378,475, filed September 4, 1953. As will be evident from Figure 1, each of the stacks 10, with the exception of the error (ERR) and spacing (SP) stacks, represents a letter while each of the stacks 20 represents a figure with the machine in the lower case operation and in most instances, one other character in upper case operation. For clarity, all of the characters represented by the stacks 10 and 20 have been placed thereabove in Figure 1 and it will be apparent that these constitute the characters found on a standard typewriter keyboard.

A source of electrical energy 33, shown here as a battery, is grounded at one side and joined by a conductor 34 to switch arms 35 arranged to be actuated by depressing an associated key (not shown) carrying the various typewriter characters to make contact with the stacks 10 and 20. A switch arm 36, similar to the switch arms 35 and actuated by depressing the carriage return and line feed key (CR and LF), joins the conductor 34 to a conductor 37 which leads to a grounded relay 38 (Figure 2). This circuit provides for perforating a tape with both the carriage return and line feed code symbols, as will be explained in detail hereinafter.

Examining Figure 2, the lines 12 to 16, inclusive, terminate at conductors 39 to 43, respectively, which are joined at one end to armatures 44 of a universal relay 45 provided with contacts 46 and at their other end to armatures 47 of a relay 48 provided with back contacts 49 and forward contacts 50.

The signals applied to the lines 12 to 16, inclusive, by selectively energizing the code stacks 10, are applied through the armatures 44 and the relay contacts 46 to conductors 51 leading to five terminal relays 52. Each of the relays 52 is grounded through a conductor 53 and actuates armatures 54, 55 and 56 into contact with relay contacts 57, 58 and 59, respectively.

When one or more of the relays 52 are energized, their armatures 54 engage the contacts 57 to establish a holding circuit including a resistor 60, energized in a manner to be described hereinafter, through a conductor 61. In addition, engagement of the armatures 55 with the contacts 58 closes a circuit traceable from ground through a conductor 62, the contacts 58, the armatures 55, conductors 63 and 64, the relay 45, a conductor 65 and a grounded battery 66. Thus, when one or more of the armatures 55 engage one or more of the relay contacts 58, the relay 45 is energized and the resultant actuation of the armatures 46 disconnects the code strip of Figure 1 from the terminal relays 52.

Energization of the terminal relays 52 also results in the grounded armatures 56 engaging the relay contacts 59 to energize, through conductors 67, 68 and 69 and a grounded battery 70, four perforator selector relay coils 71. A fifth perforator selector relay coil **71*a* has associated circuitry to preclude its energization during certain time intervals. To this end, conductors 67*a* and 67*b*, respectively joined to the contact 59 of the coil 71*a* and to the coil 71*a*, are also respectively connected to an armature 71*b* and a contact 71*c* of a relay 71*d*. A contact 28*a* adjacent to the contact 28 selectively engages the commutator 19 to energize the grounded relay 71*d* through a conductor 28*b***.

The coils 71 and **71*a* determine the code symbols that are to be transferred to a storage medium such as by perforating a moving tape (not shown) by actuation of punches 72 and 73** as described hereinafter.

Returning to the code stacks 20, energization of one of them by a selected switch 35 results in code signals being applied to the lines 22 to 26, inclusive, joined to the relay contacts 49 and to the lines 28 to 32, inclusive, joined to the relay contacts 50. Accordingly, code signals found on either the lines 22 to 26, inclusive, or the lines 28 to 32, inclusive, will be coupled to the terminal relays 52, depending on the condition of the relay 48.

As shown in Figure 2, a shift key 74 controls a switch arm 75 which couples, when closed, a grounded battery 76 through conductors 77 and 78 to energize the grounded relay 48. Therefore, actuation of the shift key 74 automatically provides for coupling signals representative of upper case characters (punctuation symbols and the like in this case) to the terminal relays 52.

Since the five unit code permits only 32 different signal combinations, it is necessary to employ the same code combinations twice and to identify them as "figure" or "letter" combinations by an appropriate code symbol on the punched tape or other storage medium preceding the figure or letter information. In the past, a pair of additional keys on a typewriter were necessary so that the operator could place the "figures" or "letters" code information on the tape and this, of course, considerably slowed the typing operation. In the present instance, the commutator 19, which alternately engages the contacts 18 and 28 provides, together with additional apparatus described hereinafter, for automatically punching the "figures" and "letters" code on the perforated tape.

Examining the triple contact commutator 19 and associated apparatus in detail, a contact 79 continuously engages the commutator 19 and is connected through a diagrammatically represented stepping solenoid 80 to ground. In the present instance, a shaft 81 is stepped 60 degrees for each actuation of the solenoid 80. Therefore, upon energization of the line 27, which occurs upon each excitation of one of the stacks 20, the commutator 19 will be stepped so that a segment thereof will engage the contact 18 of the line 17. It will be apparent that further energization of the line 27 will have no effect on the commutator 19. Subsequent energization of the line 17, which occurs upon each excitation of one of the stacks 10, will result in a similar action.

The shaft 81, driven by the solenoid 80, in addition to driving the commutator 19 also supports and drives ganged cams 82 to 89, inclusive, actuating switch arms 90 to 97, inclusive. Switch arms 90 to 95, inclusive, are grounded through a conductor 98 and when actuated, engage contacts 99 to 104, inclusive. With the exception of the cams 84 and 89 which carry three lobes, the cams on the shaft 81 are formed with six lobes to actuate their associated switches during each step of the solenoid 80.

Conductors 105 to 109, inclusive, respectively join the contacts 99 to 103, inclusive, to perforator selector relay coils 71 and 71*a* while a conductor 110 couples the contact 104 to the punch 73 which has its other side joined to a grounded battery 111.

While the switches actuated by the cams 82 to 87, inclusive, are normally opened, a contact 112 normally engages the switch arm 96, the contact 112 being joined by a conductor 113 to a further armature 115 of the relay 45 arranged to engage a relay contact 116 joined to a grounded battery 117. A conductor 118 couples the switch arm 96 to the grounded punch 72, an armature 119 being actuated by the punch 72 at the completion of its operating cycle. Normally, the armature 119 engages a contact 120 joined to a grounded battery 121, the armature 119 being coupled through a conductor 122, a current limiting resistor 123 and the resistor 60 to ground.

Returning to the cam 89, it actuates the switch arm 97 between a pair of contacts 124 and 125 joined through indicator lamps 126 and 127, respectively, to a battery 128 having its other side connected to the switch arm 97. This circuit is for the purpose of informing the operator whether the machine is in the "figures" or "letters" condition.

In the operation of an electric typewriter, depressing a single key provides both carriage return and line feed. However, it is necessary to provide two symbols on a punched tape or other storage medium in order for a telegraph printer reading the tape to perform these two functions. The relay 38 and associated apparatus accomplish this function when the switch arm 36 engages the conductor 37 to energize the relay 38, in response to the actuation of the carriage return and line feed key.

More specifically, the relay 38 actuates an armature 129, connected to a grounded battery 129*a*, between a pair of contacts 130 and 131 joined by conductors 132 and 133 to contacts 134 and 135, respectively, selectively engaging a commutator 136. A further contact 137 continuously engages the commutator 136 and is joined through a diagrammatically represented conventional stepping solenoid 138 to ground. A shaft 139 driven by the solenoid 138 supports the commutator 136 and also carries ganged three lobe cams 140 and 141 and a six lobe cam 142, these cams respectively actuating switch arms 143, 144 and 145 joined by a conductor 146 to ground. Contacts 147, 148 and 149 are selectively engaged by the switch arms 143, 144 and 145, respectively, and are tied by conductors 150, 151 and 152 to the conductors 108, 106 and 64, respectively.

Upon energization of the relay 38, the live armature 129 will engage the contact 131 to step the commutator 136 60 degrees. Consequently, the contact 134 will engage the commutator 136. The subsequent deenergization of the relay 38 results in the armature 129 engaging the contact 130 and this steps the commutator 136 another 60 degrees. The functions performed by the cams 140, 141 and 142 and their associated switch arms 143, 144 and 145 will be explained in greater detail hereinafter.

In a typical operation of the above-described illustrative embodiment of this invention, it will be assumed that a letter has last been struck on the typewriter keyboard. This results in the commutator 19 being positioned as shown in Figure 2. If a figure key is now struck, in addition to the signals furnished on the lines 22 to 26, inclusive, or 28 to 32, inclusive, depending on the position of the shift key 74, the line 27 will be energized resulting in the stepping of the commutator 19 through an angle of 60 degrees. Accordingly, the cams 82, 83, 85 and 86 will actuate their respective switch arms to ground the conductors 105, 106, 108 and 109, this action resulting in the energization of the four perforator selector relay coils 71. In addition, the cam 87 moves the switch arm 95 into engagement with the contact 104 to energize the punch 73 which results in the "figures" code combination being punched on the tape.

This stepping of the shaft 81 by the solenoid 80 also serves to light the indicator lamp 127 since the switch arm 97 engages the contact 125. Therefore, the operator can readily determine that the machine has been switched to "figures" operation.

The signals on the lines 22 to 26 or 28 to 32, inclusive, will actuate a selected number of the terminal relays 52. As a result of this, the armatures 54 and the contacts 57 establish a holding circuit for the relays 52 to the resistor 60 to store momentarily the code information. In addition, the closure of the armatures 55 and the contacts 58 will energize the relay 45 to disconnect the code strip from the relays 52 and preclude further current flow through the diodes 21. Energization of the relay 45 actuates the armature 115 into engagement with the relay contact 116 to apply the potential of the battery 117 through the conductor 113, the contact 112, the switch arm 96, the conductor 118 to energize the grounded punch 72. However, it should be noted that during a shift from "figures" to "letters" or "letters" to "figures," the circuit to the punch 72 is open due to the actuation of the switch arm 96 by the cam 88 to permit the punch 73 to insert "figures" or "letters" code symbols on the tape prior to the operation of the punch 72.

From the foregoing, it will be evident that the "figures" code symbol will be punched in the tape by the four relays 71, the relay 71*a* not being energized during the shift from "letters" to "figures" since the cam 84 is provided with only three lobes. To preclude energization for a short interval of the perforator selector relay coil 71*a* by code signals received by the terminal relays 52, the coil 71*a* is connected to its associated relay contact 59 through the armature 71*b* and the contact 71*c* of the relay 71*d*.

During a shift from "letters" to "figures," both the contacts 28 and 28*a* will engage the commutator 19 so that the relay 71*d* will be energized from the battery 33. Thus, energization of the coil 71*a* will not be possible until disengagement of the contact 28 and the commutator 19. The system is timed so that this will not occur until after the punch 73 has operated to place the "figures" code symbol on the tape. It will be evident that other suitable arrangements such as a separate commutator may be employed to accomplish the above functions.

Subsequent to the operation of the punch 73, the arms 90, 91, 83 and 94 are disengaged from the contacts 99, 100, 102 and 103, respectively, and the arm 96 engages the contact 104 to complete an energizing circuit for the punch 72 which functions to punch the code combination on the tape set up in the coils 71 and 71*a* by the terminal relays 52.

After the punch 72 has functioned, the armature 119 is actuated to disengage it from the contact 120, this action opening the holding circuit for the relays 52. Deenergization of the relays 52 also opens the universal relay 45 and the apparatus is in condition for a further operation.

The perforating mechanism including the punches 72 and 73 and the associated perforator selector relay coils 71 and 71*a* have not been described in detail since any conventional apparatus well known in the art may be employed to perform its functions. It suffices to say that when the punches 72 and 73 receive punch signals, they operate to perforate the tape and step it forward, the perforations being in accordance with the perforator selector relay coils 71 and 71*a* that are energized. For example, a standard teletype perforator may be modified to operate in connection with the above-described circuits. It will be understood that other storage mediums such as magnetic tape may also be employed in place of punched tape if suitable devices are used for the punches 72 and 73 to energize selected magnetic heads associated with the coils 71 and 71*a*.

If it is assumed that a figure was typed with the shift key 74 in the lower case position, the relay 48 would have been deenergized and the armatures 47 would be as shown in Figure 2. However, if it is desirable to employ a punctuation mark, the shift key 74 may be operated to energize the relay 48, this resulting in the armatures 47 engaging the contacts 50 which are tied to the lines 28 to 32, inclusive. Accordingly, code signals representative of punctuation characters will automatically be furnished to the relays 52 upon actuation of the shift 74. It should be noted that operation of the shift 74 does not directly affect in any manner the operation of the punches 72 and 73.

With the machine operating in the "figures" shift, depression of further figure keys will not step the commutator 19. However, if a letter key is actuated to energize one of the code stacks 10, the line 17 will be energized and current will flow through the contact 18 to the commutator 19 and the contact 79 to actuate the stepping solenoid 80. The resultant 60 degree stepping of the commutator 19 serves to move the switch arms 90 to 94, inclusive, resulting in the energization of the perforator selector relay coils 71 and 71*a*. It should be noted that in the previous operation, only the four selector relay coils 71 were energized. The difference is due to the fact that the cam 84 is provided with three lobes while the remaining cams are provided with six lobes.

The punch 73 is also energized by movement of the switch arm 95 against the contact 104 to punch the "letters" combination code on the tape. In addition, the arm 97 is returned to its position against the contact 104 to energize the indicator lamp 126. The remaining punching operation is the same as described in connection with the "figures" operation.

It will, of course, be evident that the cams 82 to 89, inclusive, and associated switches illustrate one manner in which the various switching functions may be accomplished. Obviously, relays or other equivalent switching devices may be employed in place of the cam and switch arrangement.

Depressing a single key generally provides both carriage return and line feed (CR and LF) in an electric typewriter. However, two separate code combinations must be punched on the tape in order to properly operate conventional five unit tape readers. In order to produce properly punched tape, the carriage return and line feed switch 36 when operated energizes the relay 38 through the conductor 37. The resultant movement of the armature 129 against the contact 131 steps the commutator 136 through 60 degrees to actuate the arm 143 against the switch contact 147. This energizes one of the perforator selector relay coils 71 and at the same time, the switch arm 145 engages the contact 149 to energize the relay 45 which, in closing the armature 115 against the contact 116, operates the punch 72 to place the carriage return symbol on the tape.

Upon deenergization of the conductor 37, the armature 129 reengages the contact 130 causing the armature 136 to again step 60 degrees and move the switch arm 144 against the contact 148. The energization of another one of the perforator selector relay coils 71 results and the simultaneous engagement of the switch arm 145 with the contact 149 causes further operation of the punch 72, this action placing the line feed symbol on the tape.

From the above, it will be evident that the present apparatus may be employed to convert a standard typewriter to a machine capable of perforating tape with a five unit code. By virtue of the automatic punching of the "letters" and "figures" code symbols, two additional keys formerly necessary to perform these functions may be eliminated to increase greatly the efficiency of the typing operation.

While the present invention has been described in connection with a standard typewriter, it may be applied to any key actuated mechanisms such as adding machines and computers. Therefore, it will be understood that the above described embodiment of the invention is illustrative only and modifications thereof will occur to those skilled in the art. Consequently, the invention is not to be limited to the specific apparatus disclosed herein but is to be defined by the appended claims.

I claim:

1. In coding apparatus for use with key operated mechanisms containing keys in two character groups, a code strip formed by a plurality of code stacks responsive to energization for producing first code signals, said code stacks being divided into two character groups representative of the two character groups of keys, means for selectively energizing each of said code stacks in response to actuation of an associated key for generating the first code signals, means for generating second code signals in response to the initial energization of one of the code stacks in the first group subsequent to the energization of one of the code stacks in the second group, and means for generating third code signals in response to the initial energization of one of the code stacks in the second group subsequent to the energization of one of the code stacks in the first group.

2. In coding apparatus for use with key operated mechanisms containing keys in two character groups, a code strip formed by a plurality of code stacks responsive to energization for producing first code signals, said code stacks being divided into two groups representative of the two character groups of keys, means for selectively energizing each of said code stacks in response to actuation of an associated key for generating first code signals, first and second conductor means energized during generation of the first code signals representative of characters in the first and second groups, respectively, means responsive to the initial energization of the first conductor means subsequent to the energization of the second conductor means for generating second code signals, and means responsive to the initial energization of the second conductor means subsequent to the energization of the first conductor means for generating third code signals.

3. In coding apparatus to energize selectively information transfer means including a plurality of control devices, the apparatus adapted to be employed with key operated mechanisms containing keys in two character groups, a code strip formed by a plurality of code stacks responsive to energization for producing first code signals, said code stacks being divided into two groups representative of the two character groups of keys, means for selectively energizing each of said code stacks in response to actuation of an associated key for generating the first code signals, means for selectively energizing the control devices in the information transfer means in accordance with the first code signals, first and second conductor means energized during generation of the first code signals representative of characters in the first and second groups, respectively, means responsive to the initial energization of the first conductor means subsequent to the energization of the second conductor means for generating second code signals, means for selectively energizing the control devices in the information transfer means in accordance with the second code signals, means responsive to the energization of the second conductor means subsequent to the energization of the first conductor means for generating third code signals, and means for selectively energizing the control devices in the information transfer means in accordance with the third code signals.

4. Apparatus as defined in claim 3 in which means are provided to preclude energization during operation of the second code signals energizing means of at least one of the control devices in the information transfer means by the first code signals energizing means.

5. In coding apparatus to energize selectively information transfer means including a plurality of control devices, the apparatus adapted to be employed with key operated mechanisms containing keys in two character groups, a code strip formed by a plurality of code stacks responsive to energization for producing first code signals, means for selectively energizing each of said code stacks in response to actuation of an associated key, said code stacks being divided into two character groups representative of the two character groups of keys, a pair of conductor means joined to two different portions of a number of the code stacks in one of the character groups of stacks, each of said number of code stacks producing when energized distinctive first code signals on each of the conductor means, said distinctive first code signals being indicative of two characters, switch means adapted to be actuated by a particular key for normally coupling one of said conductor means to means responsive to said first code signals for controlling the information transfer means, said switch means being responsive to actuation of the shift key for coupling the other of said conductor means to said control means, means for generating second code signals in response to the initial energization of one of the code stacks in the first group subsequent to the energization of one of the code stacks in the second group, means responsive to said second code signals for controlling the information transfer means, means for generating third code signals in response to the initial energization of one of the code stacks in the second group subsequent to the energization of one of the code stacks in the first group, and means responsive to said third code signals for controlling the information transfer means.

6. Apparatus as defined in claim 5 wherein the key operated mechanisms contain a dual function key, means responsive to the actuation of the dual function key for generating fourth and fifth code signals, and means for energizing the information transfer means in accordance with the fourth and fifth code signals.

7. Apparatus as defined in claim 5 in which circuit interrupting means are provided between the switch means and the first code signals control means, and means responsive to the energization of the first code signals control means by the first code signals for operating said circuit interrupting means to decouple the code strip and the first code signals control means.

8. In apparatus for use with key operated mechanisms, a plurality of code stacks containing a number of unidirectional conducting elements, said stacks being connected in parallel relation to form a code strip, a plurality of load devices coupled by switch means to said strip, a source of electrical energy, means for selectively coupling said source to each of said code stacks in response to actuation of an associated key to energize a selected number of said load devices, and means responsive to energization of the load devices for operating the switch means momentarily to interrupt the coupling between the code strip and the load devices.

9. In coding apparatus for use with key operated mechanisms, a code strip formed by a plurality of code stacks responsive to energization for producing code signals, means for selectively energizing each of said code stacks in response to actuation of an associated key, a pair of conductor means joined to different portions of a number of the code stacks, each of said number of code stacks producing when energized distinctive code signals on each of the conductor means, said code signals being indicative of two characters, and switch means adapted to be actuated by a particular key for normally coupling one of said conductor means to control means, said switch means being responsive to actuation of said particular key for coupling the other of said conductor means to said control means.

10. In coding apparatus for use with a typewriter containing a shift key and a number of writing keys several of which represent two characters, a code strip formed by a plurality of code stacks responsive to energization for producing code signals, means for selectively energizing each of said code stacks in response to actuation of an associated writing key, a pair of conductor means joined to different portions of a number of the code stacks representative of writing keys carrying two characters, each of said number of code stacks producing when energized distinctive code signals on each of the conductor means, said code signals being indicative of the two characters on the associated writing key, and switch means normally coupling one of the conductor means to control means, said switch means being responsive to actuation of the shift key for coupling the other of said conductor means to said control means.

11. In coding apparatus to energize selectively information transfer means, the apparatus adapted to be employed with key operated mechanisms containing a dual function key and character keys, a code strip formed by a plurality of code stacks responsive to energization for producing first code signals, means for selectively energizing each of the code stacks in response to actuation of an associated character key for generating the first code signals, means for energizing the information transfer means in accordance with the first code signals, means responsive to actuation of the dual function key for generating second and third code signals, and means for energizing the information transfer means in accordance with the second and third code signals.

12. In coding apparatus to energize selectively information transfer means, the apparatus adapted to be employed with key operated mechanisms containing a dual function key and character keys, a code strip formed by a plurality of code stacks responsive to energization for producing first code signals, means for selectively energizing each of the code stacks in response to actuation of an associated character key for generating the first code signals, means for energizing the information transfer means in accordance with the first code signals, means responsive to the depression of the dual function key for generating second code signals, means for energizing the information transfer means in accordance with the second code signals, means responsive to the release of the dual function key for generating third code signals, and means for energizing the information transfer means in accordance with the third code signals.

References Cited in the file of this patent

UNITED STATES PATENTS

| | | |
|---|---|---|
| 1,832,118 | Hershey | Nov. 17, 1931 |
| 2,559,637 | Kirchel | July 10, 1951 |
| 2,665,336 | Saykay | Jan. 5, 1954 |